United States Patent [19]

Ponticelli

[11] Patent Number: 4,742,978
[45] Date of Patent: May 10, 1988

[54] UNIVERSAL MOUNTING SYSTEM FOR INSTALLING VEHICLE RADIO EQUIPMENT

[76] Inventor: Robert J. Ponticelli, 20274 Delita Dr., Woodland Hills, Calif. 91364

[21] Appl. No.: 57,982

[22] Filed: Jun. 4, 1987

[51] Int. Cl.$^4$ ............................................... G12B 9/00
[52] U.S. Cl. ..................................... 248/27.1; 312/7.1
[58] Field of Search ...................... 248/675, 674, 27.1, 248/201, 220.2, 220.3, 220.4, 221.3, 224.4, 225.2, 316.7, 223.3, 27.3; 312/7.1, 245; 455/345

[56] References Cited

U.S. PATENT DOCUMENTS

| | | | |
|---|---|---|---|
| 3,685,879 | 8/1972 | Tsuji | 312/245 |
| 4,068,175 | 1/1978 | Maniaci | 455/345 |
| 4,447,030 | 5/1984 | Nattel | 248/27.1 |
| 4,462,562 | 7/1984 | Alves | 312/7.1 X |
| 4,524,933 | 6/1985 | Rouws | 248/27.3 |
| 4,555,080 | 11/1985 | Nara | 248/27.1 |
| 4,560,124 | 12/1985 | Alves | 248/27.1 |
| 4,572,465 | 2/1986 | Rasca | 248/27.1 |
| 4,699,341 | 10/1987 | Ponticelli | 312/7.1 X |

FOREIGN PATENT DOCUMENTS

| | | | |
|---|---|---|---|
| 542996 | 5/1956 | Belgium | 455/345 |
| 1478112 | 5/1965 | France | 312/245 |

Primary Examiner—J. Franklin Foss
Assistant Examiner—Robert A. Olson
Attorney, Agent, or Firm—Edward A. Sokolski

[57] ABSTRACT

A rectangular frame has a plurality of slots and apertures formed therein for use in mounting any one of a plurality of different radios thereon in a selected position. A plurality of bar members are formed along each of the corners of the frame. Formed in the frame directly below each of the bar members and running in a row along the inner edge of each bar member is a row of apertures. Brackets for use in mounting the frame to the vehicle dashboard or other convenient portion of the vehicle fit matingly on each of the bars for slidable motion therealong. Each bracket has a tab member which is adapted to matingly snap into one of the apertures running along the bar member. The brackets are slidably adjusted along their associated bar members to a selected position opposite one of the apertures in which position the tabs thereof are permitted to snap into the aperture to lock the bracket in the desired position. If the bracket is to be moved to a different position the tab thereof can be moved out of the aperture with a suitable tool such as a screwdriver to permit slidable movement of the tab to a new position along its associated bar member opposite another one of the apertures.

6 Claims, 3 Drawing Sheets

UNIVERSAL MOUNTING SYSTEM FOR INSTALLING VEHICLE RADIO EQUIPMENT

This invention relates to the installation of radio equipment in vehicles and more particularly to a universal mounting kit suitable for use in installing a variety of different model radios in different vehicles.

With the great number of different vehicles and radio equipment available for installation therein the installer of such equipment has a complicated task in that it is generally necessary to stock a variety of different components for use in mounting various radio equipment in various vehicles. Attempts have been made to alleviate this problem such as described in U.S. Pat. No. 4,462,564 wherein open slots are formed in the sides of a radio mounting frame which enables the mounting of such support brackets for the radio at preselected positions therealong where they are clamped in position by means of a locking screw. My application Ser. No. 000,475 filed Jan. 5, 1987 provides an improvement over the prior art in that the need for locking screws is obviated, the mounting of the support brackets and other components which need to be selectively attached to the frame at various positions thereon being achieved by means of interlocking tabs which matingly engage slots formed in the frame.

The system of the present invention provides a novel means for positioning and attaching the mounting brackets to the frame which employs tab members which snap into apertures formed in the frame in locking engagement therewith in the same general manner as in my prior application. In the system of the present invention, however, the mounting brackets are slidably fitted over longitudinal bar members formed at the corners of the frame and are slidably positioned along these bar members to bring the bracket to the desired mounting position along the frame whereat the tab snaps into the mating aperture. The use of the corner bar members over which the brackets are fitted and along which the brackets can be slidably positioned facilitates the installation of the brackets and provides a firmer attachment of the brackets to the frame.

Briefly described the improvement of the present invention is as follows. A rectangular bar member is formed in each of the corners of a rectangular frame. A longitudinal channel is formed in the bottom surface of each bar member with a longitudinal row of apertures formed in the frame along the inner lower edge of each bar member. A bracket is mounted on each of the bar members. Each of the brackets has a generally "G" shaped clamp portion with a first tab forming one of the edges of "G" and which extends towards the back of the "G" in a direction substantially parallel to the base of the "G". This first tab fits into the channel formed in the bottom of the bar member. A second tab member extends from the top edge of the "G" in a direction opposite to that of the first tab and substantially normal to the back of the "G" and opposite the base of the "G". The second tab is adapted to matingly engage any one of the apertures formed in the frame along the edge of the bar. Each bracket also has an attachment portion which extends therefrom which has at least one aperture therein for use in attaching the bracket to the vehicle dashboard or the like with a bolt. The brackets thus can be slidably positioned along their associated bars and when in the desired position, the second tab is permitted to snap into the opposing aperture to lock the bracket in this selected position.

It is therefore an object of this invention to facilitate the mounting of various radio installations in various vehicles.

It is a further object of this invention to make for a universal mounting system for use in mounting radio equipment in vehicles utilizing brackets which can be attached to a mounting frame without the use of hardware.

Other objects of this invention will become apparent as the description proceeds in connection with the accompanying drawings of which:

Figure 1:
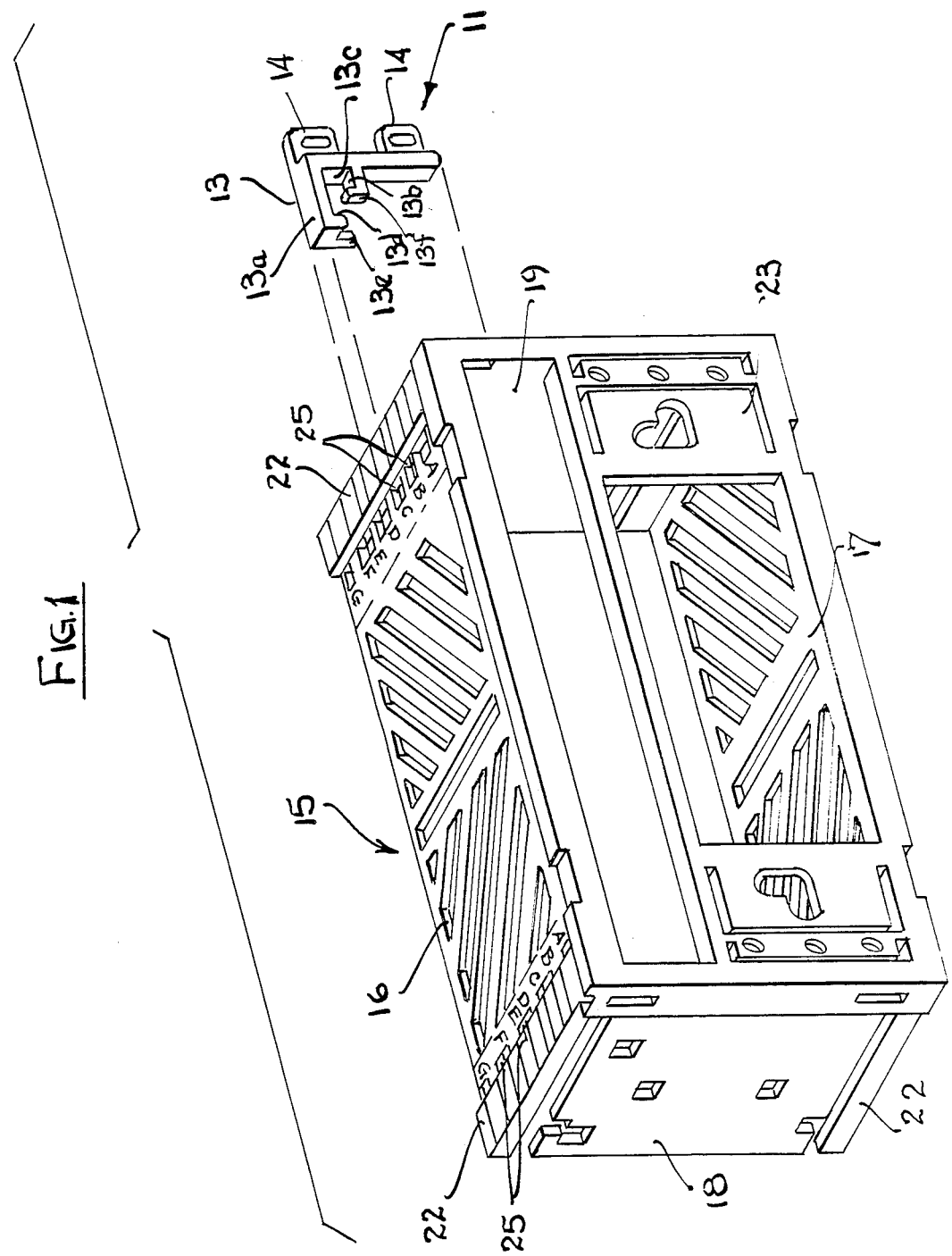
FIG. 1 is an exploded perspective view of a preferred embodiment of the invention.
Figure 2:
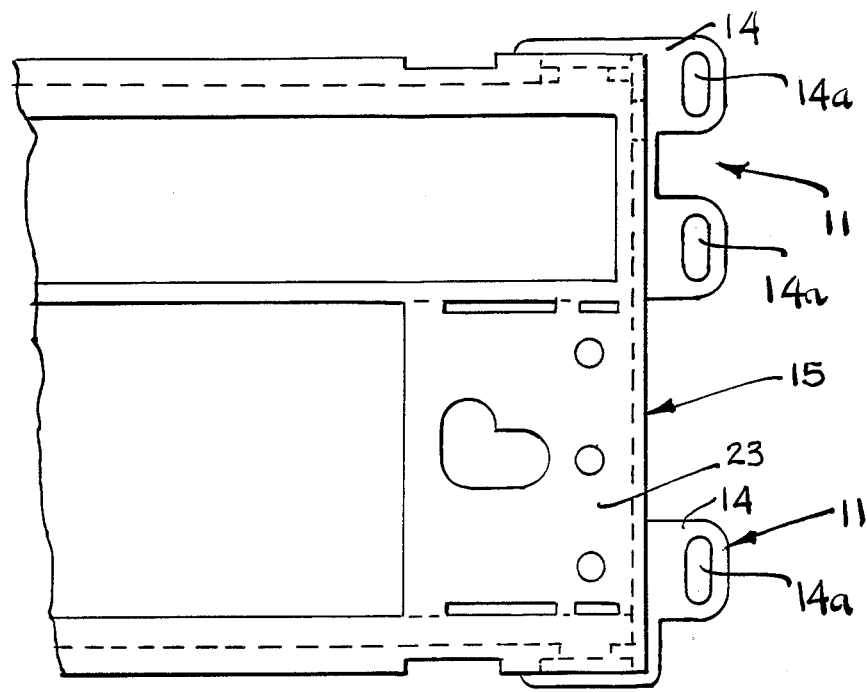
FIG. 2 is a partial cut-away section in front elevation of the preferred embodiment.
Figure 3:
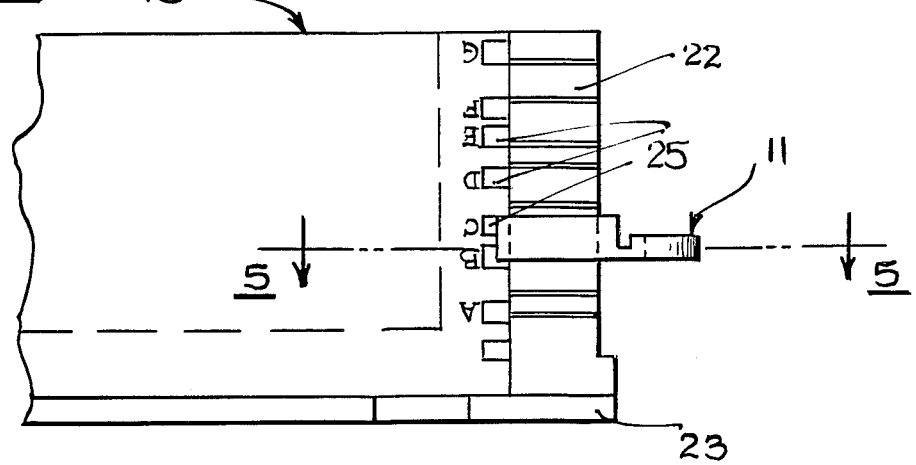
FIG. 3 is apartial cut-away section in top plan view of the preferred embodiment.
Figure 6:
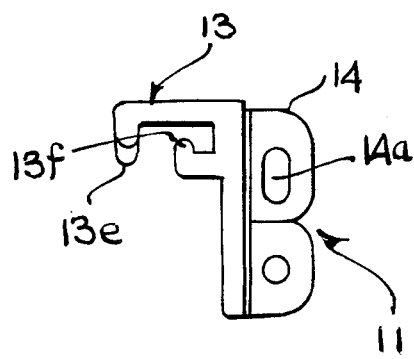
FIGS. 6 and 7 are front elevational views of two alternative configurations of the brackets of the invention.
Figure 7:
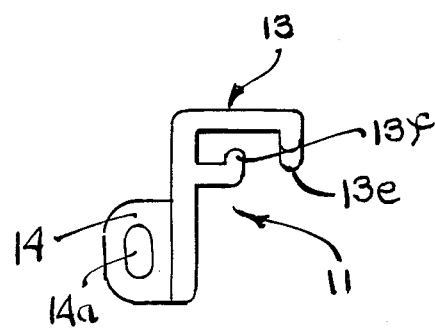
Figure 4:
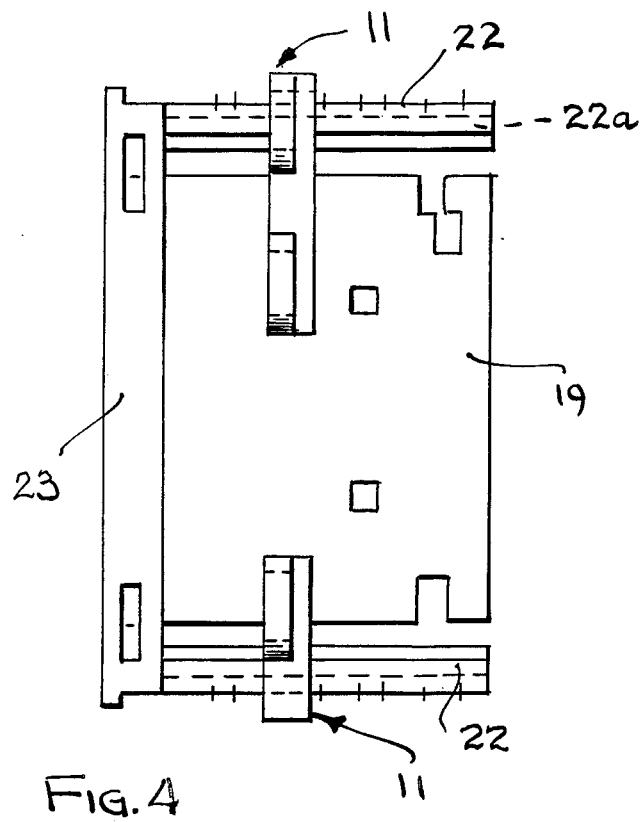
FIG. 4 is a side elevational view of the preferred embodiment.

Referring now to the figures, a preferred embodiment of the invention is illustrated. The brackets 11 of the invention include a generally "G" shaped clamp portion 13 for use in clamping the bracket to rectangular frame 15 and an attachment portion 14 for use in attaching the bracket to the vehicle dashboard or the like. The clamp portion has a top wall 13a, a shorter opposing bottom wall 13b, a side wall 13c and an opposing shorter side wall 13d. A first tab 13e extends downwardly from side wall 13d and a second tab 13f extends upwardly from the bottom wall 13b.

Figure 5:
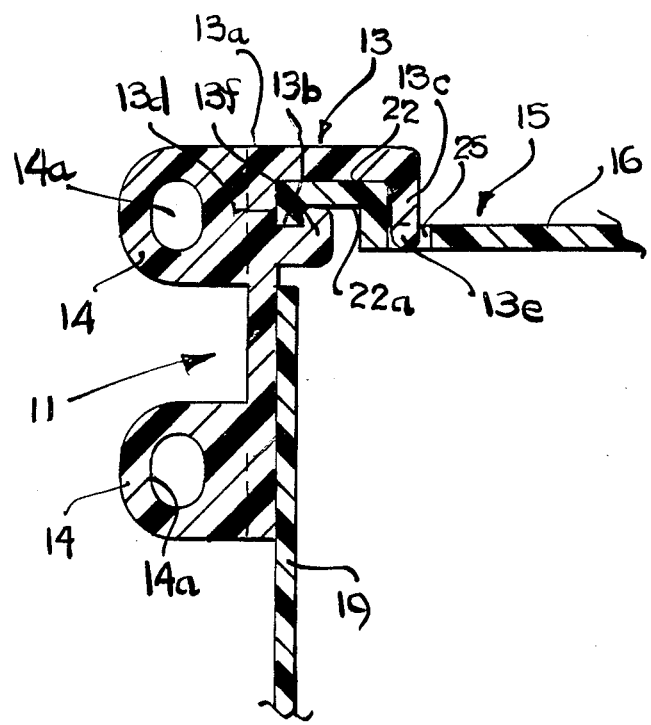
FIG. 5 is a cross sectional view taken along the plane indicated by 5—5 in FIG. 3.

Rectangular frame 15 has opposing top and bottom walls 16 and 17 and opposing side walls 18 and 19. Further, a front panel (not shown) may be snapped over the front panel 23 for use with a particular radio installation. Radio equipment is supported on bottom wall 17 and may be attached to this wall and/or wall 16 by means of suitable hardware through the various slots provided in these walls. Formed in each of the corners of frame 15 along the side edges of walls 16 and 17 is a similar bar member 22. Bar members 22 have elongated channels 22a which run the entire longitudinal extent thereof formed in the bottom walls thereof, as best can be seen in FIG. 5. Running along the inner bottom edge of each of the bar members is a row of apertures 25 which extend through walls 16 and 17.

Brackets 11 are installed on frame 15 in locking engagement therewith by placing the clamp portions 13 thereof on bars 22 with the top wall portion 13a running along the top wall of the bar, the bottom wall portion 13b running along the bottom wall and the side wall portions 13c and 13d riding along the side walls of the bar. Tab 13f fits within channel 22a while tab 13e fits within a selected one of apertures 25. Tab 13e can be lifted with a suitable tool such as a screwdriver to facilitate slidable positioning of clamp 13 along the bar until tab 13e is opposite a selected one of the apertures 25 whereat the tab is permitted to snap into such aperture. To facilitate the installation of a particular radio with a particular vehicle in conjunction with an instruction sheet, the apertures 25 are lettered and the brackets 11 are suitably numbered and lettered. The attachment portions 14 of the brackets are arranged in various configurations as can be seen in FIGS. 2, 5, 6 and 7. Apertures 14a are used in conjunction with mounting hardware such as bolts to attach the brackets to the dashboard of a vehicle or the like.

While the invention has been described and illustrated in detail, it is to be clearly understood that this is intended by way of illustration and example only and is not to be taken by way of limitation, the spirit and scope of the invention being limited only by the terms of the following claims.

I claim:

1. A system for mounting a radio or the like in a vehicle comprising:
    a frame having at least a pair of opposing side walls,
    a bar member formed in at least two of the corners of said frame, each of said bar members running along a separate wall of said frame, said bar members each having top, bottom and side walls with a longitudinal channel being formed in the bottom wall thereof,
    a longitudinal row of apertures being formed in said side walls along the inner lower edge of each of said bar members, and
    a bracket mounted on each of said bar members, each of said brackets comprising a clamp portion having top, bottom and side walls which fit matingly along the walls of said bar members, said clamp portion further having a first tab extending from one end thereof which fits into any one of the longitudinal channels of said bar members and a second tab extending from the opposite end thereof which fits into any one of the apertures of said longitudinal row thereof, said brackets further having attachment portions extending therefrom for use in attaching said brackets to a selected portion of said vehicle,
    said brackets being slidably positionable along said bar members to a selected position whereat the second tabs of said brackets are permitted to snap into one of the apertures formed in said side walls to lock the bracket to the frame.

2. The system of claim 1 wherein said frame is rectangular and has at least two pairs of opposing walls, one of said bar members being formed in each of the four corners of said frame member.

3. The system of claim 1 wherein the clamp portions of said brackets are generally "G" shaped, said first tab extending towards the back of said "G", said second tab extending in a direction substantially normal to the back of the "G" and opposite to the direction of first tab.

4. A system for mounting a radio or the like in a vehicle comprising:
    a frame having at least one wall,
    a bar member formed in at least two of the corners of said frame, each of said bar members running along a separate wall of said frame, each of said bar members having top, bottom and side walls,
    a longitudinal row of apertures being formed in said wall along the inner lower edge of each of said bar members, and
    a bracket mounted on each of said bar members, each of said brackets comprising a clamp portion having top, bottom and side walls which fit matingly along the walls of said bar members, said clamp portion further having a tap extending from one end thereof which fits into any one of the apertures of said longitudinal row thereof, said bracket further having attachment portions extending therefrom for use in attaching said brackets to a selected portion of said vehicle,
    said brackets being slidably positionable along said bar members to a selected position whereat the tabs of said brackets are permitted to snap into one of the apertures formed in said wall to lock the brackets to the frame.

5. The system of claim 4 wherein said frame is rectangular and has at least two pairs of opposing walls, one of said bar members being formed in each of the four corners of said frame member.

6. The system of claim 5 wherein the clamp portions of said brackets are generally "G" shaped, said tab extending in a direction substantially normal to the back of the "G" and opposite the base of the "G".

* * * * *